United States Patent

Kirby

[15] 3,642,022
[45] Feb. 15, 1972

[54] FLOW-OPERATED SELECTOR VALVE FOR IRRIGATION SYSTEMS

[72] Inventor: William D. Kirby, 2121 Hamilton Court, Richland, Wash. 98255

[22] Filed: Mar. 23, 1970

[21] Appl. No.: 21,885

[52] U.S. Cl. ............137/119, 137/625.11, 137/625.17, 137/625.18, 137/624.27
[51] Int. Cl. ............................................F16k 31/363
[58] Field of Search ............137/119, 118, 625.11, 624.11, 137/625.17, 625.18, 624.27

[56] References Cited

UNITED STATES PATENTS

| | | | |
|---|---|---|---|
| 3,472,265 | 10/1969 | Davis | 137/119 |
| 3,369,204 | 2/1968 | Davis | 137/119 |
| 3,124,162 | 3/1964 | Cameron | 137/625.11 |
| 3,533,432 | 10/1970 | Kirby | 137/119 |

Primary Examiner—Herbert F. Ross
Assistant Examiner—William H. Wright
Attorney—Keith S. Bergman

[57] ABSTRACT

A multiport valve, operated by flow interruption, to change flow progressively through an ordered array of outputs. A central chamber provides plural output orifices concentrically positioned therein and carries a central rotator having plural valving means for the orifices, one less in number than the number of output orifices associated therewith. The rotator is carried upon a stem that communicates within the input channel to the central chamber to cause the rotator to move axially within the chamber to a closed position upon each cyclic flow through the input channel. A spring biases the rotator to a normally open position and cam means are provided about the inner periphery of the valve chamber to communicate with dogs carried by the rotator to cause partial rotation upon each vertical motion to change output orifices.

2 Claims, 11 Drawing Figures

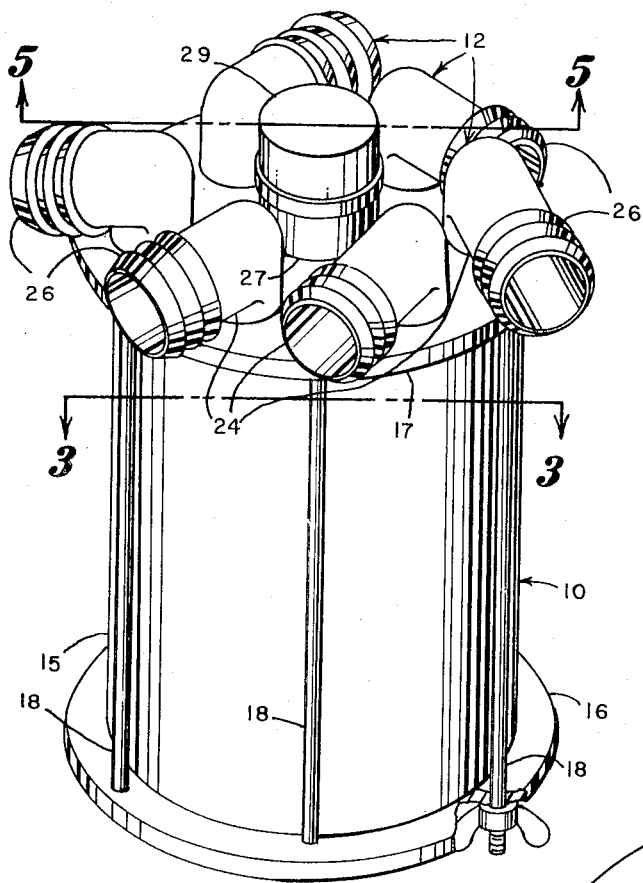
FIGURE 3
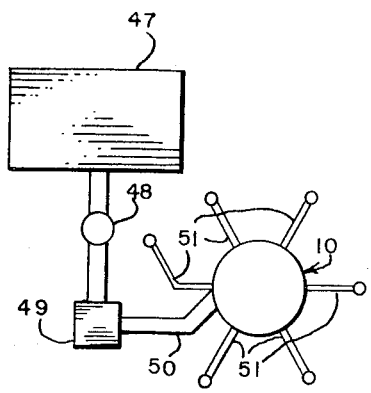
FIGURE 2
FIGURE 1
William D. Kirby, INVENTOR.
ATTORNEY

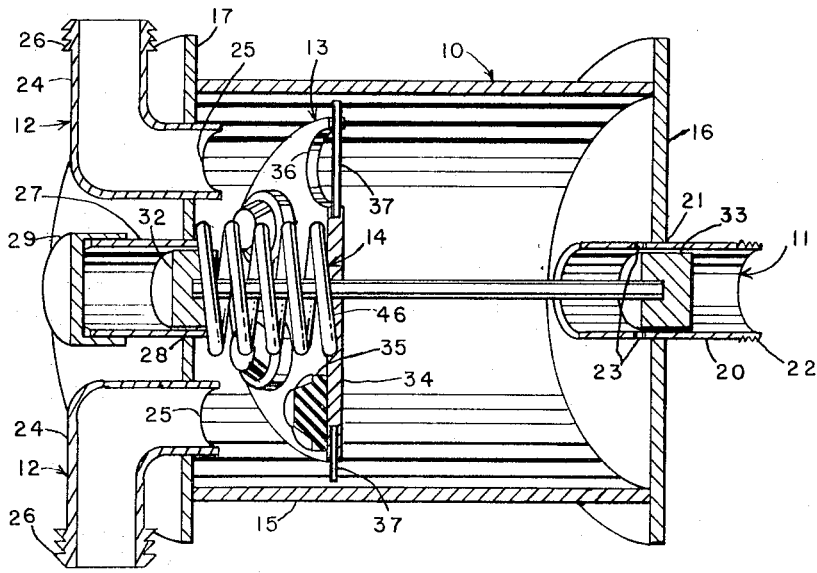
FIGURE 6
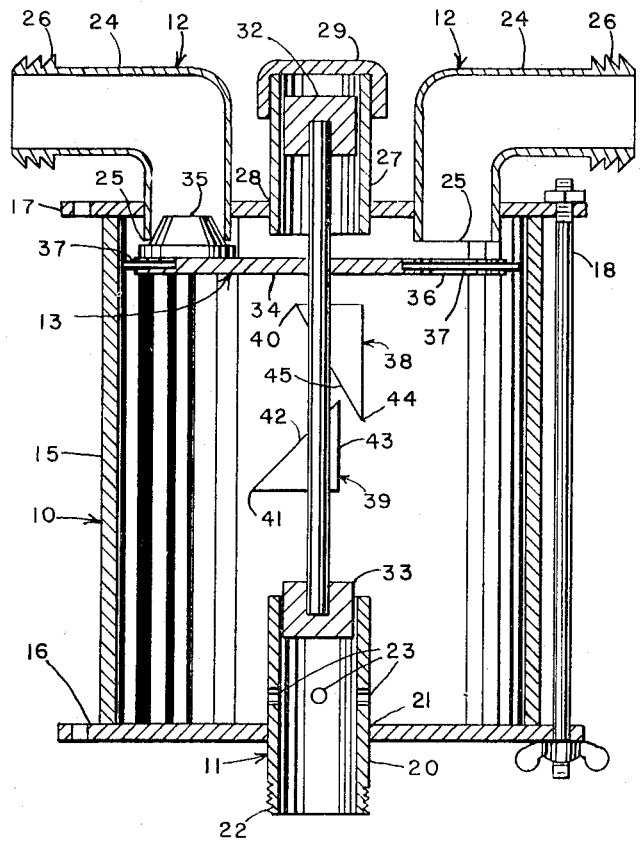
FIGURE 5
FIGURE 4
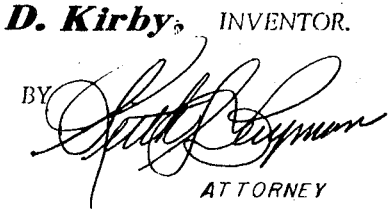
William D. Kirby, INVENTOR.
ATTORNEY 3,642,022
SHEET 3 OF 3
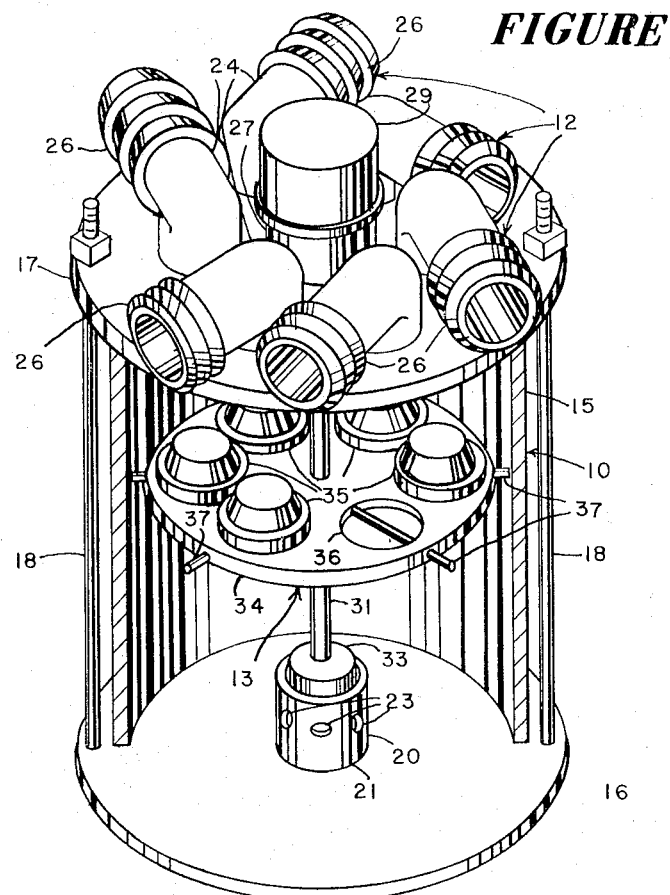
FIGURE 7
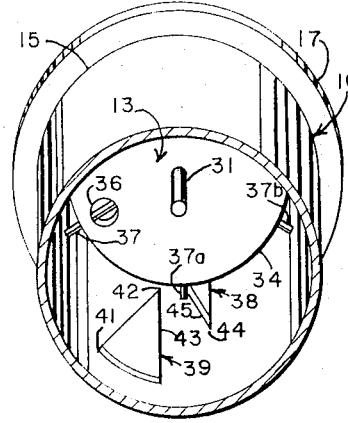
FIG. 8A
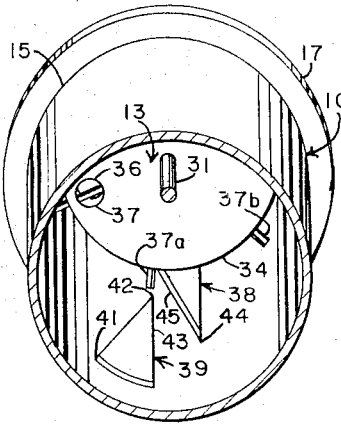
FIG. 8B
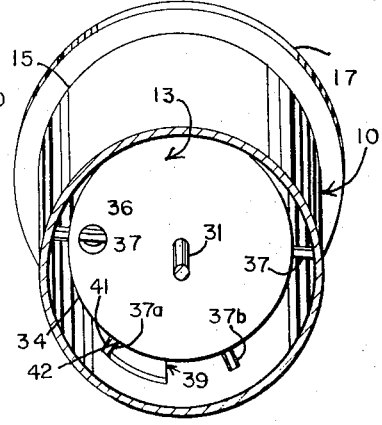
FIG. 8C
FIGURE 8
William D. Kirby, INVENTOR.
BY
ATTORNEY 3,642,022

FLOW-OPERATED SELECTOR VALVE FOR IRRIGATION SYSTEMS

BACKGROUND OF INVENTION

Related Applications

This application constitutes an improvement upon a similar device for which an application for Letters Patent is now pending in the U.S. Pat. Office under Ser. No. 759,039.

B. Field of Invention

This invention relates generally to the field of multiport selector valves and more particularly to such a valve having a medial valving structure carried in a central valve chamber and adapted to move radially upon flow induced vertical motion to cyclically change flow between a plurality of potentially openable output orifices upon flow interruption.

C. Description of Prior Art

The general background of flow interruption valves for irrigation and particularly those that open one of a plurality of potential output circuits upon each cyclic change of flow, was discussed in my prior patent application. This invention constitutes an improvement upon that prior invention.

Although operating upon the same principle as my prior invention, the instant device provides a valving structure differing chiefly from the prior device in providing: a valve that has a continuously open outlet whenever flow commences therethrough; a simpler method of rotating the valving means upon its linear motion; a mechanically biased valving structure that may be operated in any position without reference to gravity; and a structure that is less costly, more durable and more reliable. All of these distinctions and improvements may be more readily seen in the appended specification.

SUMMARY OF INVENTION

The instant invention provides a valve that directs flow therethrough successively to one of plural outlet ports in response to interruption of flow to the valve.

This function is accomplished with a valve body defining a cylindrical chamber with plural exit ports concentrically arrayed in one end and an elongate input port, medially positioned in the other end, so configured as to require linear motion of a plunger rotatably and slideably carried within the input port to allow flow into the valve body. A valve stem communicates with the plunger for both axially elongate/motion and rotary. The valve stem carries in its end opposite the plunger a circular valving disc having valve stations in one face to communicate with and close all but one of the exit ports. Paired cooperating cams are provided about the inner peripheral surface of the valve chamber to communicate with dogs carried by the peripheral circular surface of the valving disc to cause the disc to rotate a radial distance equal to that between exit ports upon each cyclic lineal motion induced by flow interruption. Mechanical biasing means are provided to maintain the valving disc in a normally open position.

With this structure, then, as flow ceases through the valve the valving disc will be moved by its bias to an open position and by this motion rotated the radial distance between exit ports so that flow will change from one exit port to that immediately forwardly adjacent upon representment of flow. The operation will continue cyclically in the same fashion upon each flow interruption.

In providing such a valving mechanism it is:

A principal object to create an improved multiport valve that will operate to present flow therethrough successively to one of a plurality of output ports in response to interruption of the flow to the valve.

To provide such a structure that is activated hydraulically by flow interruption with a minimum of mechanical parts and operations to provide extreme reliability.

A further object to provide such a structure that is not dependent upon air pressure to differential hydraulic pressure for operation.

A further object to provide such a structure that maintains one exit port always open so that the valve may not jam or cease to operate upon initiation of flow.

A still further object to provide such a structure that is mechanically biased to cause operation in any position without reference to gravity.

A still further object to provide such a valve structure that is of new and novel design, of rugged and durable nature, of simple and economic manufacture, and one otherwise well adapted to the uses and purposes for which it is intended.

Other and further objects of my invention will appear from the following specification and accompanying drawings which form a part of this application. In carrying out the objects of my invention, however, it is to be understood that its essential features are susceptible of change in design and structural arrangement with only one preferred and practical embodiment being illustrated in the accompanying drawings as required.

BRIEF DESCRIPTION OF DRAWINGS

In the accompanying drawings, wherein like numbers of reference refer to similar parts throughout;

FIG. 1 is a semidiagrammatic illustration of a typical irrigation system showing its various elements with my invention in relation thereto.

FIG. 2 is an isometric surface view of my valve showing its external structure and parts and their relationship.

FIG. 3 is a vertical cross-sectional view of the device of FIG. 2 taken on the line 3—3 thereon in the direction indicated by the arrows.

FIG. 4 is an isometric surface view of the plunger and valving disc of my invention showing their nature in detail.

FIG. 5 is a vertical cross-sectional view of the device of FIG. 2 taken on the line 5—5 of that Figure in the direction indicated by the arrows.

FIG. 6 is an isometric cut away view of a specie of my invention showing a spring as a mechanical bias to urge the valving disc to open position.

FIG. 7 is a cutaway, isometric view showing the various parts of my invention to illustrate particularly their operation.

FIG. 8 is a compound illustration, comprising diagrams 8A, 8B and 8C, further illustrating the operation of the valve of FIG. 7.

DESCRIPTION OF PREFERRED EMBODIMENT

Referring now to the drawings in more detail it will be seen that my invention generally comprises valve body 10, having input port 11 in one end and plural exit ports 12 in the other with valve structure 13 communicating therebetween and in the specie of FIG. 6 biasing means 14 urging the valve structure to a normally open position.

Valve body 10 provides cylindrical side element 15 enclosed at the input end by bottom plate 16 and at the output end by top plate 17, each of shape similar to the cross section of the body member but somewhat larger. The ends are maintained in appropriate positional relationship upon the side element by plural elongate bolts 18 extending externally of side element 15 and through cooperating opposed holes in the outwardly extending lips of ends 16, 17. If desired, the adjacent surfaces of the body elements may be provided with a gasket, mortice and tendon-type joint or some other sealing device (not shown), though in general I have not found this necessary if the parts be reasonably well configured. All of these elements must be made from some rigid, reasonably durable substance, I prefer metal or plastic though undoubtedly other materials might serve the purpose of my invention, if not so well.

Input structure 11 provides elongate cylindrical input pipe 20 extending through medial hole 21 in bottom 16 and on both sides thereof. The outward extension of input pipe 20 provides means 22 for connection to an external supply of pressurized water (not shown), in this instance external threads. The internal projection of the input pipe within the valve chamber provides plural input orifices 23 at a spaced distance above bottom 16.

Plural exit ports 12 are formed by cylindrical pipes 24 arranged concentrically at equally spaced radial distances about valve top 17. The important feature of this structure to my invention is the concentric, radially equally spaced positioning of the exit orifices and the formation of valve seats 25 therein within the valve chamber. In the instance illustrated, the pipes take the form of elbows and terminate in their distal ends with means 26 to aid the attachment of external distribution piping (not shown), in this instance annular protrubrances adapted to accept flexible plastic pipe.

Preferably both input and exit structures are formed of plastic pipe and join the valve body by adhesion or cohesion, depending upon the nature of the valve body. Obviously other rigid materials might serve this purpose, and if used other known means of joinder may be appropriate.

Preferably valve guide pipe 27 is provided in a medial, axially aligned position communicating through hole 28 in top 17 to the valve chamber. Cap 29 closes the outward projection of the pipe and may be provided with a vent (not shown) if the structure have too tight a fit upon the contained piston to allow easy operation. The guide structure allows extension of the guide piston and assures alignment of the valve structure to prevent any fouling. This structure is not necessary to my invention but is a desirable aid to proper and reliable functioning.

Valve structure 13 provides elongate valve stem 31 carrying upper guide piston 32 to loosely fit for sliding and rotating motion within the channel of valve guide pipe 27 and lower piston 33 to similarly fit within the channel of input pipe 20. The stem is of such length that the pistons will always be within their respective channels but yet allow some lineal motion of the valve stem along the axis of the valve body. Valve disc 34 is structurally carried by the upper medial portion of the valve stem. This is a flat disclike element of circular configuration with a diameter somewhat less than the internal diameter of cylindrical valve side 15. The valve disc is provided with plural valve elements 35 and one hole 36, all configured, spaced and dimensioned relative the plural exit ports so that valve elements 35 will close all but one exit port when in closed condition and at this time hole 36 will be immediately adjacent the remaining exit port.

Activation means 13 provides plural rodlike valve disc dogs 37 projecting radially outward from the peripheral surface of valve disc 34 at points where the dogs would, if extended, pass through the diameter of a valve element 35 or hole 36, as the case may be. These dogs are formed of some rigid material, preferably metal, substantially equal in length and so dimensioned and positioned that a line through two diametrically opposed dogs is slightly less than the internal diameter of cylindrical valve side element 15 so that valve disc 34 may move both axially and radially within the cylindrical side member.

Upper activation cam 38 and lower activation cam 39 are sheetlike triangular members, as illustrated in FIG. 3, formed arcuately, as illustrated in FIG. 5, to fit immediately inwardly adjacent the inner surface of cylindrical side element 15. These cams are mechanically fastened on the inner surface of the cylindrical side member by some means such as adhesion. The radially forward facing apex 40 of upper cam 38 is vertically below the line that constitutes a radius of valve disc 34 and passes through a diameter of one exit port pipe 24. The radially forward facing apex 41 of lower activating cam 39 is radially forward of apex 40, a radial distance slightly less than the radial distance through two adjacent exit port pipes. With this structure then, when the valve be in closed position, as illustrated in FIGS. 3 and 5, one valve disc dog 37a will be immediately to the left (as the reader views the drawings) or forwardly of apex 40 of upper cam 38. If in this condition the valve stem and disc move downwardly in the valve chamber, in response to flow interruption, valve disc dog 37a will contact upper angled surface 42 of lower cam 39 and in proceeding downwardly to its lowermost position will move radially forward some distance to bring the next rearwardly adjacent valve disc dog 37b to a vertical position radially rearward of vertical surface 43 of lower cam 39 and radially forward of lower apex 44 of upper cam 38. In this position as valve stem and disc again move axially upwardly in response to water flow, valve disc dog 37b will contact lower angle surface 45 of upper cam 38, and as the valving disc moves completely upwardly it will be forced to move radially forwardly so that the valve disc will move radially forward the radial distance between two adjacent exit ports to position the hole 36 in the valve disc under the next the adjacent exit port and seal all others.

Biasing means 14 maintains the valve disc in normally open or downward position. In the instance illustrated in FIG. 6, the biasing means comprises compression spring 46 communicating from top 17, about the inward projection of the valve guide pipe and valve stem, downwardly to the upper surface of valve disc 34. Obviously this biasing might be provided in many other fashions. If the valve were oriented as shown in FIG. 2 gravity would serve to bias the valve structure downwardly, but if it be desired to position the valve in some other orientation it is required that a separate mechanical biasing means be used. Separate mechanical biasing of the valving structure tends to give greater reliability and prevent any possible fouling.

Having thusly described my invention, its operation may now be understood.

Firstly a valve is formed according to the foregoing specification. If it be desired to use the valve to change circuits in a multicircuit irrigation system, it would be established somewhat as illustrated in FIG. 1 where pressurized water from source 47 is supplied by pump 48 to timing device 49 which allows a flow for a predetermined period, interrupts it, and then cyclically reestablishes it. Water is supplied through feed pipe 50 to the input orifice of my valve structure. Various irrigation laterals 51 communicate from the exit orifices of my valve to ultimately disperse the pressurized water.

With this hydraulic circuitry when operation of the valve is commenced, the valve disc will be in its normally biased open or downwardmost position. As pressurized water is presented to input pipe 20, lower piston 30 is caused to move upwardly by reason of the water pressure and water will commence to enter the valve chamber through the plural holes 23. As the valve stem is caused to move upwardly by motion of the lower piston 33, one particular disc dog will be radially rearward of vertical surface 43 of the lower cam and radially forward of lower apex 44 of the upper cam so that it will necessarily move forwardly along lower angle surface 45 of the upper cam and thereby necessarily align the valve disc with all valve elements closing the various associated exit ports. If there be any slight misalignment, the conical noses of valves 35 will tend to correct it and properly position the valve elements within the exit pipe orifices.

As water continues to enter the structure it fills up the valve body and passes either through hole 36 in the valve disc, or around the outer periphery thereof, to exit through the one particular exit port that is not closed by a valve element. This condition continues until interruption of flow to the valve.

Upon interruption, pressure is removed upon lower piston 33 and the valve stem and valve disc move downwardly to their normally open, biased position, by reason of the mechanical bias of spring 46 or gravity as the case may be. When this motion occurs the particular valve disc dog that moved along the angled surface of the upper cam in the immediately prior cycle will be radially forward of apex 40 of the upper cam and will therefore contact angled surface 42 of the lower cam and move downwardly and radially forward to position the rearwardly adjacent valve disc dog immediately radially rearward of vertical edge 43 of the lower cam and radially forward of apex 44 of the upper cam to be potentially capable of completing the next successive cycle. In this fashion as each interruption in flow through the valve occurs, the valve will move the open exit orifice one output orifice forward, in cyclical fashion.

It is to be particularly noted that there will always be one open exit orifice and it is not possible that all exit orifices be closed at any time. It is to be further noted that the structure of the instant device is most simple, reliable and free of potential fouling. It is also to be noted that with the mechanical biasing shown the valve may be operated in any orientation without reference to gravity.

The foregoing description of my invention is necessarily of a detailed nature so that a specific embodiment of it might be set forth as required, but it is to be understood that various modifications of detail, rearrangement and multiplication of parts may be resorted to without departing from its spirit, essence or scope.

Having thusly described my invention, what I desire to protect by Letters Patent, and

What I claim is:

1. A valve structure to sequentially change flow from one of a plurality of exit ports to an adjacent part in response to flow interruption, comprising, in combination:

a body enclosing a cylindrical valve chamber;

an input pipe of some length communicating in a medial position with one end of the valve chamber;

plural exit ports communicating concentrically in equally radially spaced fashion with the second end of the valve chamber and terminating therein in valve seats;

valve structure, movable within the valve chamber having an elongate valve stem with a piston at the lower end for extension within the input channel and carrying in the upper medial part a circular valve disc having one less valve element than the number of exit ports and a hole all so configured that the valve elements will close all but one exit port and the hole will be immediately adjacent that one port;

means of biasing the valve disc to an open position;

means of lineally moving the valve structure to closed position responsive to flow therethrough;

activation means communicating between the body and the valve structure to move the valve structure radially the distance between two adjacent exit ports upon each lineal motion of the valve structure including a plurality of valve disc dogs projecting normally from the periphery of the valve disc radially outward from the center of each valve element and hole; and at least one cam carried by the body wall defining the valve chamber to contact the valve disc dogs to move the disc rotatively upon lineal motion.

2. The selector valve of the nature aforesaid to switch flow therethrough from one of a plurality of exit ports to the next adjacent port in response to interruption of fluid flow to the valve, comprising in combination:

a body defining a cylindrical valve chamber with opposed ends having an axially aligned input pipe of some length communicating with the valve chamber through one end and having plural fluid input orifices at a spaced distance from the end communicating into the valve chamber, plural exit ports communicating in concentric, equally radially spaced fashion with the second end of the valve chamber to form substantially coplanar valve seats within the valve chamber, and a valve guide pipe in the second end axially coincident with the input pipe and valve chamber;

valve structure longitudinally and rotatively movable within the valve chamber having an elongate valve stem with pistons at both ends to slidably and rotatably fit respectively in the input pipe and valve guide pipe, carrying in the upper medial part a planar valve disc somewhat smaller than the valve chamber having plural valve elements, one less in number than the number of exit ports, and a hole, all configured so that the valve elements will close all but one exit port and the hole will be immediately adjacent that one exit port;

a spring communicating between the valve structure and body biasing the valve structure to a normally open position; and activation means communicating between the body and the valve structure to move the valve structure radially upon linear motion of that structure, comprising valve disc dogs projecting normally from the periphery of the valve disc radially outward from the center of each valve element and hole and cam means carried by the body wall defining the valve chamber to movably contact the valve disc dogs.

* * * * *